United States Patent
Murakami et al.

(10) Patent No.: US 6,630,100 B1
(45) Date of Patent: Oct. 7, 2003

(54) MANUFACTURING METHOD FOR SPENT FUEL STORAGE MEMBER AND MIXED POWER

(75) Inventors: Kazuo Murakami, Hyogo (JP); Yasuhiro Sakaguchi, Hyogo (JP); Toshiro Kobayashi, Hiroshima (JP); Toyoaki Yasui, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/827,911

(22) Filed: Apr. 9, 2001

(51) Int. Cl.$^7$ ................................................. B22F 3/00
(52) U.S. Cl. ............................. 419/12; 419/32; 419/38; 419/41; 419/49
(58) Field of Search ............................. 419/12, 32, 41, 419/49, 38

(56) References Cited

U.S. PATENT DOCUMENTS

| | | | |
|---|---|---|---|
| 3,785,801 A | * 1/1974 | Benjamin | |
| 4,623,388 A | * 11/1986 | Jatkar et al. | 420/528 |
| 4,722,754 A | * 2/1988 | Ghosh et al. | 148/417 |
| 4,749,545 A | * 6/1988 | Begg et al. | 419/13 |
| 4,923,532 A | * 5/1990 | Zedalis et al. | 148/514 |
| 5,298,468 A | * 3/1994 | Pyzik | 419/15 |
| 5,589,652 A | * 12/1996 | Arato et al. | 75/235 |

FOREIGN PATENT DOCUMENTS

| | | |
|---|---|---|
| CH | 675 699 | 10/1990 |
| DE | 31 05 012 | 8/1982 |
| DE | 43 08 612 | 9/1994 |
| FR | 1 142 741 | 9/1957 |
| FR | 2 231 764 | 12/1974 |
| GB | 846 292 | 8/1960 |
| JP | 59-96242 | 6/1984 |
| JP | 61-235523 | 10/1986 |
| JP | SHO 61-203398 | 12/1986 |
| JP | 1-208446 | 8/1989 |
| JP | 3-82732 | 4/1991 |
| JP | HEI 4-341506 | 11/1992 |
| JP | HEI 6-295805 | 10/1994 |
| JP | 8-260075 | 10/1996 |
| JP | HEI 11-6024 | 1/1999 |
| JP | 2000-514552 | 10/2000 |
| JP | 2001-42090 | 2/2001 |
| JP | 2001-116884 | 4/2001 |
| WO | WO 98/00258 | 1/1998 |

OTHER PUBLICATIONS

Derwent Publications, AN 1988–115713, JP 63–061989, Mar. 18, 1988.

Patent Abstracts of Japan, JP 10–095670, Apr. 14, 1998.

"Basics and Industrial Technology of Aluminum Material", Light Metal Society, May 1, 1985, p. 410, Fig. 29., English Abstract.

Shigeo Tsuchida, "Degassing and Consolidation in Aluminum Powder Metallurgy", Light Metal, pp. 656 to 663, vol. 37, 10$^{th}$ issue, 1987, English Abstract.

Hideo Sano, et al., "Application of Rapidly Solidified Aluminium Alloys", Sumitomo Light Metal Company Technical Report, vol. 35, Oct. 1994, p. 84., English Abstract.

Masao Tokita, "Trends in Advanced SPS Spark Plasma Sintering Systems and Technology", Journal of Powder Engineering Society, vol. 30, 10$^{th}$ issue, Oct. 10, 1993, pp. 26 to39., English Abstract.

* cited by examiner

*Primary Examiner*—Ngoclan Mai
(74) *Attorney, Agent, or Firm*—Oblon, Spivak, McClelland, Maier & Neustadt, P.C.

(57) ABSTRACT

A rectangular pipe is molded by mixing aluminum powder with powder of a neutron absorbing material, molding a premolded body by means of cold isostatic pressing (CIP), canning the premolded body, sintering the premolded body by means of hot isostatic pressing (HIP), performing outer cutting and end face cutting on the can after the sintering, taking a billet out of the can, and extruding this billet.

9 Claims, 16 Drawing Sheets

53
52 IMPELLER
51 ROTARY CONTAINER

MANUFACTURING METHOD FOR SPENT FUEL STORAGE MEMBER AND MIXED POWER

FIELD OF THE INVENTION

The present invention relates to a manufacturing method for spent fuel storage members that accommodate and store spent nuclear fuel assemblies whose burnup has been finished, and form a cask or a rack. This invention also relates to mixed powder that is suitable for manufacturing such spent fuel storage members.

BACKGROUND OF THE INVENTION

A nuclear fuel assembly at the final stage of a nuclear fuel cycle, at which burnup of the fuel has been finished so that the fuel can no longer be used, is referred to as spent nuclear fuel. Currently, such spent nuclear fuel is stored and controlled in a storage facility until it is subjected to chemical reprocessing. A storage system using a fuel pool, for example, is executed by sinking an SUS rack with rectangular pipes tied in a bundle into the pool and accommodating spent fuel assemblies in these rectangular pipes Accordingly, this system satisfies requirements such as a cooling effect, a shielding effect, and subcriticality.

In recent years, a start has been made using a member, which is obtained by adding boron to a stainless material, as rectangle pipes forming the rack. By using such rectangular pipes, neutron absorbing materials disposed between the rectangular pipes can be omitted, therefore, the gaps between the rectangular pipes can be narrowed. Accordingly, the number of rectangular pipes insertable into the pit of the pool increases, which makes it possible to increase the number of spent fuel assemblies to be accommodated in the pit.

Such rectangular pipes are applicable to various types of storage system using a cask, a horizontal silo, a pool, a bold, or the like. However, if the rack is formed with these pipes, a large number of rectangular pipes are required to be manufactured. Therefore, technology for enabling efficient productivity of the rectangular pipes has been demanded. Further, each rectangular pipe needs to absorb neutrons produced from the spent fuel assembly, therefore, the solidity of its structure is required.

Further, a plate type of rack is known other than the rack with the rectangular pipes used for storage of the spent fuel assemblies. This plate type of rack also requires efficient productivity and the solidity of its structure.

SUMMARY OF THE INVENTION

It is an object to provide a manufacturing method for such rectangular pipes.

According to one aspect of this invention, powder of aluminum is mixed with powder of a neutron absorbing material, and this mixed powder is premolded by means of cold isostatic pressing (CIP). The premolded body is canned and subjected to sintering. Accordingly, a billet as a preprocessed product for molding a spent fuel storage member is finished. By premolding the mixed powder, nonuniformity in molding density can be reduced. In order to take out the billet from the can, the can is subjected to outer cutting and end face cutting. Further, it is preferable to perform sintering by means of hot pressing or hot isostatic pressing (HIP). The method for Dummy HIP or atmospheric sintering may also be used other than these processes. The spent fuel storage member includes rectangular pipes that form a basket, or plate members that form a plate type rack. The sintering is performed by means of hot pressing or HIP, which makes it possible to manufacture a spent fuel storage member with higher quality.

According to another aspect of this invention, the canning step may be omitted and vacuum sintering may be performed. If the canning step is omitted, no machining such as outer cutting is required after vacuum sintering. Therefore, manufacturing the billet may be facilitated. Further, vacuum hot pressing is the most adequate for the vacuum sintering. In addition to this process, vacuum dummy HIP may be used. By performing the sintering through the vacuum hot pressing, a low-cost, yet high-quality spent fuel storage member can be manufactured.

According to still another aspect of this invention, a premolded body is subjected to electric discharge sintering, which makes it possible to sinter it for a shorter period as compared to ordinary sintering. Accordingly, the spent fuel storage member can efficiently be manufactured. Since the step of canning is omitted, the need for machining such as outer cutting is eliminated, which makes it possible to manufacture the spent fuel storage member at lower cost. Further, it is preferable to use electric discharge plasma sintering for electric discharge sintering. That is because sufficient sintering can be performed by removing a passive film from aluminum by the energy due to this electric discharge plasma sintering. In addition to this electric discharge plasma sintering, thermal plasma sintering can also be used.

Further, by extruding the billet manufactured by the method, a rectangular pipe or a rod as the spent fuel storage member can easily be manufactured.

Further, it is clear that a neutron absorbing material such as boron or a boron compound agglomerates and segregates during sintering if its average particle diameter is as small as about some micrometers. Therefore, boron whose average particle diameter is ten-odd micrometers or more is used in the ordinary sintering. However, if the average particle diameter is large, the strength of the spent fuel storage member is decreased.

Therefore, in the manufacturing method according to the invention, the aluminum powder is mixed with the powder of the neutron absorbing material by mechanical alloying. Various types of ball milling can be used for this mechanical alloying. Each particle of the aluminum powder is changed to a flat shape during a milling process by ball milling. The particles of the neutron absorbing material are milled by ball milling to become considerably small as compared to the initial average particle diameter, and are dispersed into the aluminum matrix while being rubbed thereinto. Accordingly, the neutron absorbing material can be dispersed finely and uniformly, thus improving the mechanical strength of the spent fuel storage member.

Further, by performing ball milling, the balls are worn out while colliding against each other, which causes the component of the balls to be mixed into the powder. In order to solve this problem, each ball formed with an element as its main component, which is supposed to be added originally, is used, and this element will be added to the powder through attrition of the balls. By doing this, it is possible to omit some steps of the manufacturing process.

Further, the powder is mixed using a powder mixing device that generates high-velocity airflow. Accordingly, the powder particles of the neutron absorbing material in the high-velocity airflow are made finer by collision, and are sunk into and attached to the surfaces of the aluminum powder particles that are also in the high-velocity airflow. Accordingly, the powder particles of the neutron absorbing material can be dispersed finely and uniformly into the aluminum powder particles, thus improving the mechanical strength of the spent fuel storage member. Further, the rotating speed of a rotary container used for the powder mixing device that generates the high-velocity airflow is preferably set in a range from 70 to 80 m/sec. That is because, if the number of revolutions is low, the neutron absorbing material is not attached to aluminum and the remaining absorbing material changes the mixing ratio. On the other hand, if the number of revolutions is high, aluminum is welded inside the device due to heat produced at the time of collision.

According to still another aspect of this invention, by sintering the neutron absorbing material powder, the particles of the neutron absorbing material powder during sintering can be prevented from their agglomeration. The particles of boron are milled to finer ones by mechanical alloying and are dispersed into the particles of aluminum powder so as to be rubbed into the aluminum powder particles. Thus, the spent fuel storage member manufactured by using such powder becomes excellent in its mechanical strength.

According to still another aspect of this invention, by sintering the neutron absorbing material powder, the particles of the neutron absorbing material powder during sintering can be prevented from their agglomeration. The particles of boron are milled to finer ones by a powder mixing device that generates high-velocity airflow, and are sunk into and attached to the surfaces of the aluminum powder particles. Thus, the spent fuel storage member manufactured by using such powder becomes excellent in its mechanical strength.

Other objects and features of this invention will become apparent from the following description with reference to the accompanying drawings.

DESCRIPTION OF THE PREFERRED EMBODIMENTS

Preferred embodiments of the manufacturing method for spent fuel storage members and the mixed powder according to this invention will be explained in detail below with reference to the drawings. It should be noted that this invention is not limited by these embodiments.

Figure 1:
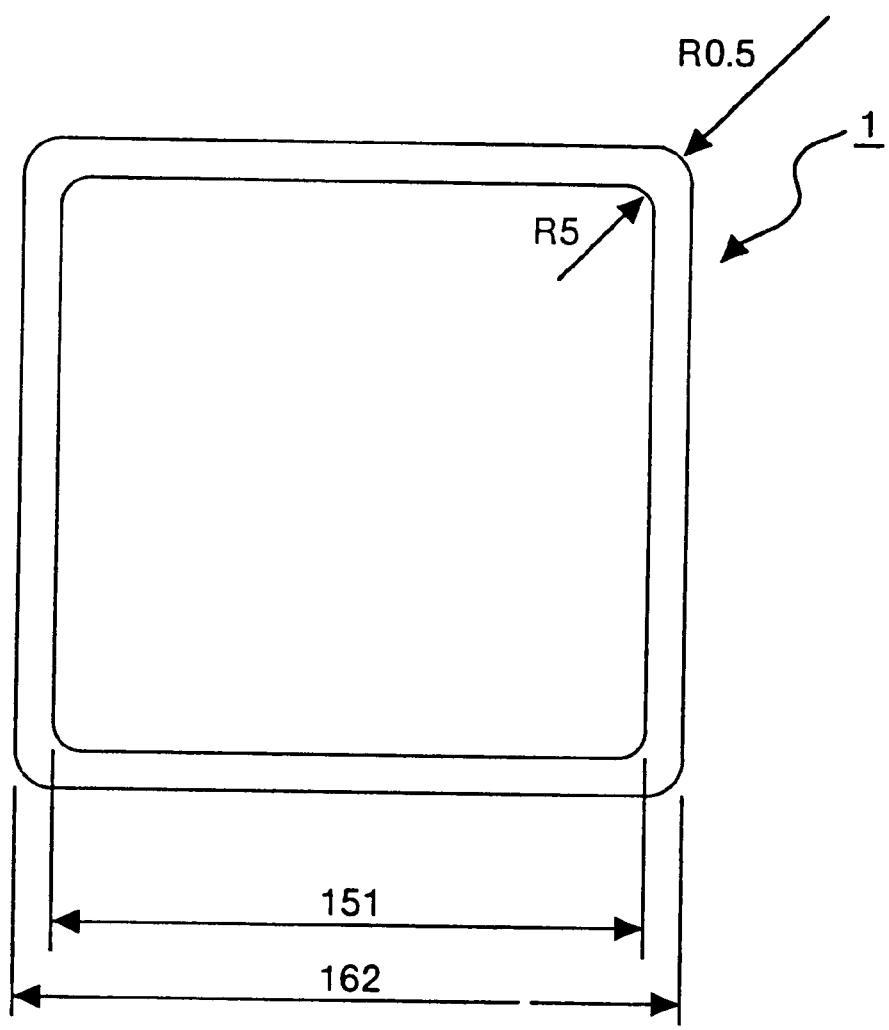
FIG. 1 is a cross-sectional view showing the rectangular pipe.

The cross-sectional view in FIG. 1 shows the rectangular pipe. This rectangular pipe 1 is square in cross section, and is made of an aluminum composite material or an aluminum alloy obtained by adding powder of boron or of a boron compound, that has the capability of neutron absorption, to powder of Al or of an Al alloy. Other than boron, any of cadmium, hafnium, or a rare earth element, which has a large cross section for neutron absorption, can be used for this neutron absorbing material. Boron or a boron compound is mainly used for a boiling water reactor (BWR), while an Ag—In—Cd alloy is used for a pressurized water reactor (PWR). If boron is used as a dispersion material, the amount of boron to be contained is preferably 3 wt % or less in order to easily be processed. The composition of the Ag—In—Cd alloy is generally formed with 15 wt % of In and 5 wt % of Cd. Any oxide of europium, dysprosium, samarium, or gadolinium can be used for the rare earth element.

Figure 2:
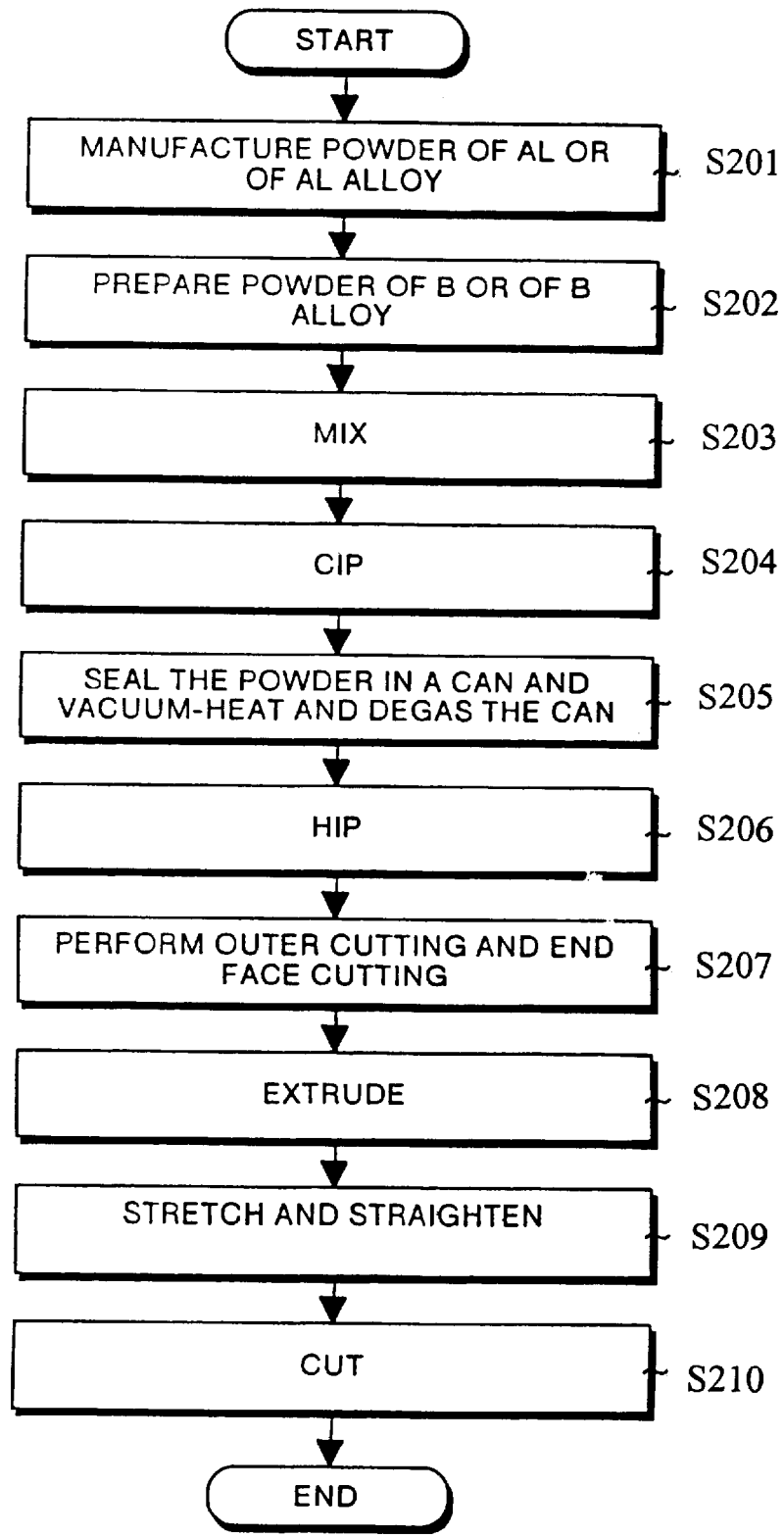
FIG. 2 is a flow chart showing a manufacturing method for the rectangular pipe according to a first embodiment of this invention.

An example of specific methods for manufacturing the rectangular pipe 1 will be explained below. The flow chart in FIG. 2 shows the manufacturing method for the rectangular pipe according to a first embodiment of this invention. Powder of Al or of an Al alloy is manufactured through a quench solidifying method such as an atomizing method (step S201), powder of B or of a B alloy is prepared (step S202), and both of these particles are mixed for 10 to 20 minutes by a cross rotary mixer, a V-shaped rotary mixer, a ribbon mixer, or a pug mixer (step S203). This mixing may be performed in an argon atmosphere. The average particle diameter of the aluminum powder is 35 $\mu$m, and the average particle diameter of $B_4C$ is about 10 $\mu$m.

Any metal explained below may be used for the Al or the Al alloy. That is, pure aluminum metal, an Al—Cu base aluminum alloy, an Al—Mg base aluminum alloy, an Al—Mg—Si base aluminum alloy, an Al—Zn—Mg base aluminum alloy, and an Al—Fe base aluminum alloy. $B_4C$, $B_2O_3$, or the like can be used for the B or the B compound. The amount of boron to be added to aluminum is preferably 1.5 wt % or more and 9 wt % or less. That is because sufficient absorption power can not be obtained if the added amount of boron is 1.5 wt % or less and the extension to stretch is reduced if it is more than 9 wt %.

The mixed powder is put in a rubber case, and this rubber case is evacuated to about 10-2 Torr, is vacuum-sealed by a hermetic tape, and is highly pressurized uniformly from all directions by CIP (Cold Isostatic Press) at room temperature to perform powder molding (step S204). As a molding condition of the CIP, the molding pressure is set to 100 MPa to 200 MPa. The volume of the powdery body is reduced by about 20% through the CIP processing so that a premolded body will have a diameter of 600 mm and a length of 1500 mm. Through the application of pressure to the product uniformly from every direction by the CIP, it is possible to obtain a high-density molded product, which has less variation in molding density.

The premolded body is then vacuum-sealed in an aluminum can (aluminum alloy seamless can: JIS6063). The can is evacuated to about $10^{-4}$ Torr, and is heated up to 300° C. (step S205). A gas component and moisture content are removed from the can in this degassing process. The molded product, that has been vacuum-degassed, is remolded by HIP (Hot Isostatic Press) in the following step (step S206). Molding conditions of the HIP are set as follows: temperature: 400° C. to 450° C., time: 30 sec, and pressure: 6000 tons, so that the diameter of the molded product will be 400 mm.

In order to remove the can, the can is subjected to outer cutting and end face cutting through machining (step S207), and a billet is hot-extruded using a port-hole extruder (step S208). As extruding conditions in this case, the heating temperature is set to a range from 500° C. to 520° C. and the extruding velocity is set to 5 m/min. These conditions are changed as required depending on the B content.

After the extrusion molding, the molded product is subjected to stretch straightening (step S209), wherein an unsteady part and an evaluation part are cut to obtain a product (step S210). The finished rectangular pipe 1 becomes such a rectangle that one side of its cross section is 162 mm and one side of its inner side is 151 mm, as shown in FIG. 1.

In the above example, the port-hole extruder, which has a high compression rate and is suitable for complicated shape extrusion of a soft material such as aluminum is used for the extruder. However, the extruder is not limited to the above machine. For example, a fixed or moving mandrel system may be employed. Hydrostatic extrusion may be performed other than direct extrusion. That is, selection may be made by a concerned party as required within a possible range. Further, near net shape molding becomes possible by using the HIP. However, as an extruding step is provided in the downstream side, even if dummy HIP is used instead of the HIP, sufficient precision can be ensured. More specifically, ceramic particulate matter as a pressure transmission medium is put into a die that is compressed in a uniaxial direction, and is sintered. An excellent rectangular pipe 1 can be manufactured also by using this method.

Instead of the HIP, hot pressing may be used. The hot pressing is a method for heating a heat-resistant die and sintering it under the uniaxial pressurization. In this case, the hot pressing is executed by sealing the premolded body in a can, vacuum-degassing the can, and heating it at a temperature of 400° C. to 450° C. for 10 sec to 30 sec under the pressure of 6000 tons. Since an extruding step is provided in the downstream side, a billet with sufficient quality can be manufactured even by the hot pressing. However, if a sintering state is not good enough because of the size of the billet and some other conditions, HIP may be used. The advantages of the hot pressing are excellent productivity and low cost. Further, an atmospheric sintering method may be used other than the hot pressing.

Figure 3:
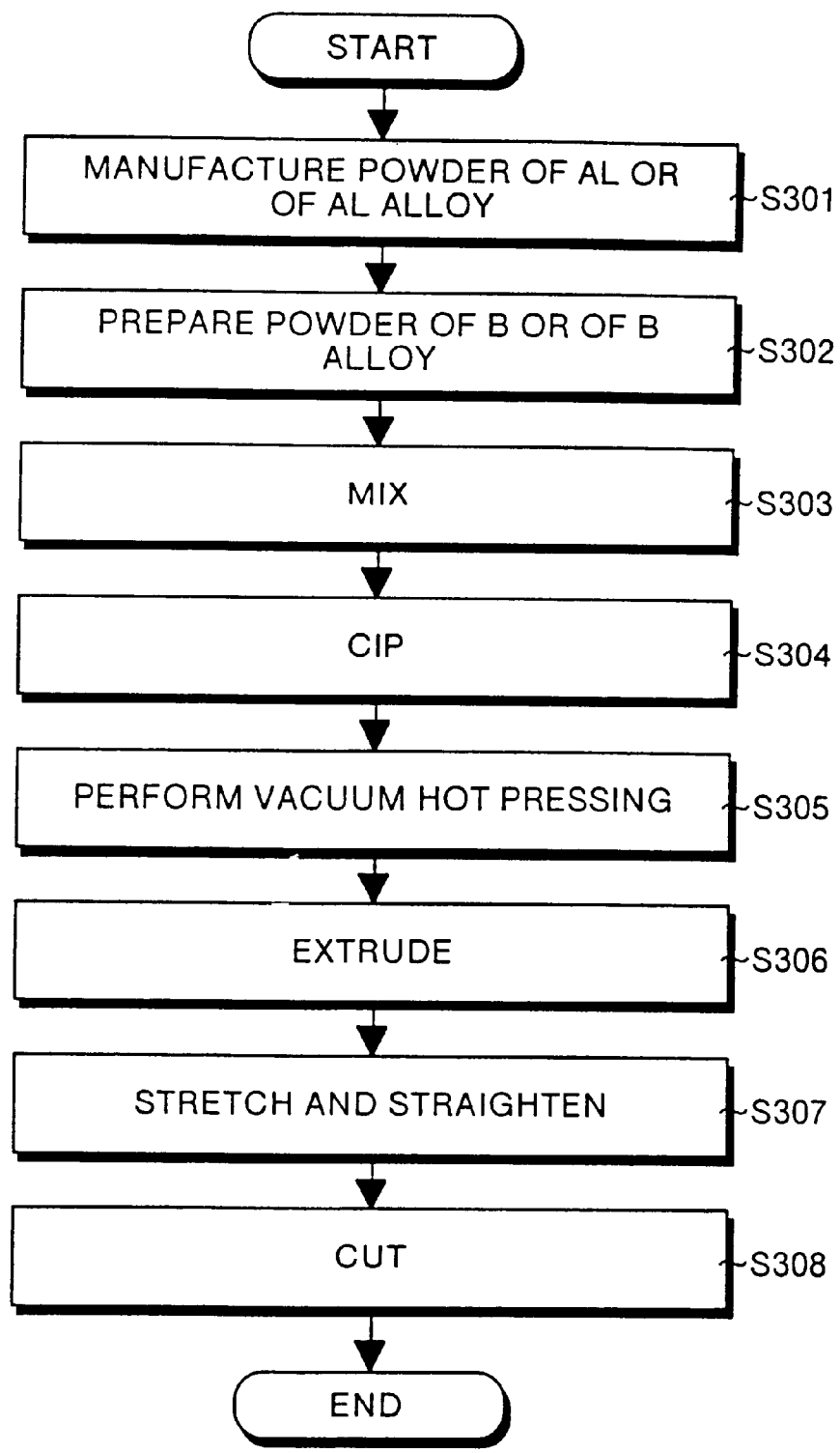
FIG. 3 is a flow chart showing a manufacturing method for the rectangular pipe according to a second embodiment.

The flow chart in FIG. 3 shows a manufacturing method for the rectangular pipe 1 according to a second embodiment. This manufacturing method for the rectangular pipe 1 is characterized in that vacuum-hot pressing is used (vacuum-hot pressing step: S305) instead of the steps of sealing the premolded body in the can and vacuum-heating and degassing the can (step S205), subjecting the can to HIP (step S206), and performing outer cutting and end face cutting on the can (step S207). The other steps are the substantially same as these in the first embodiment, therefore, explanation of these steps is omitted (steps S301 to S304, and S306 to S308).

Figure 4:
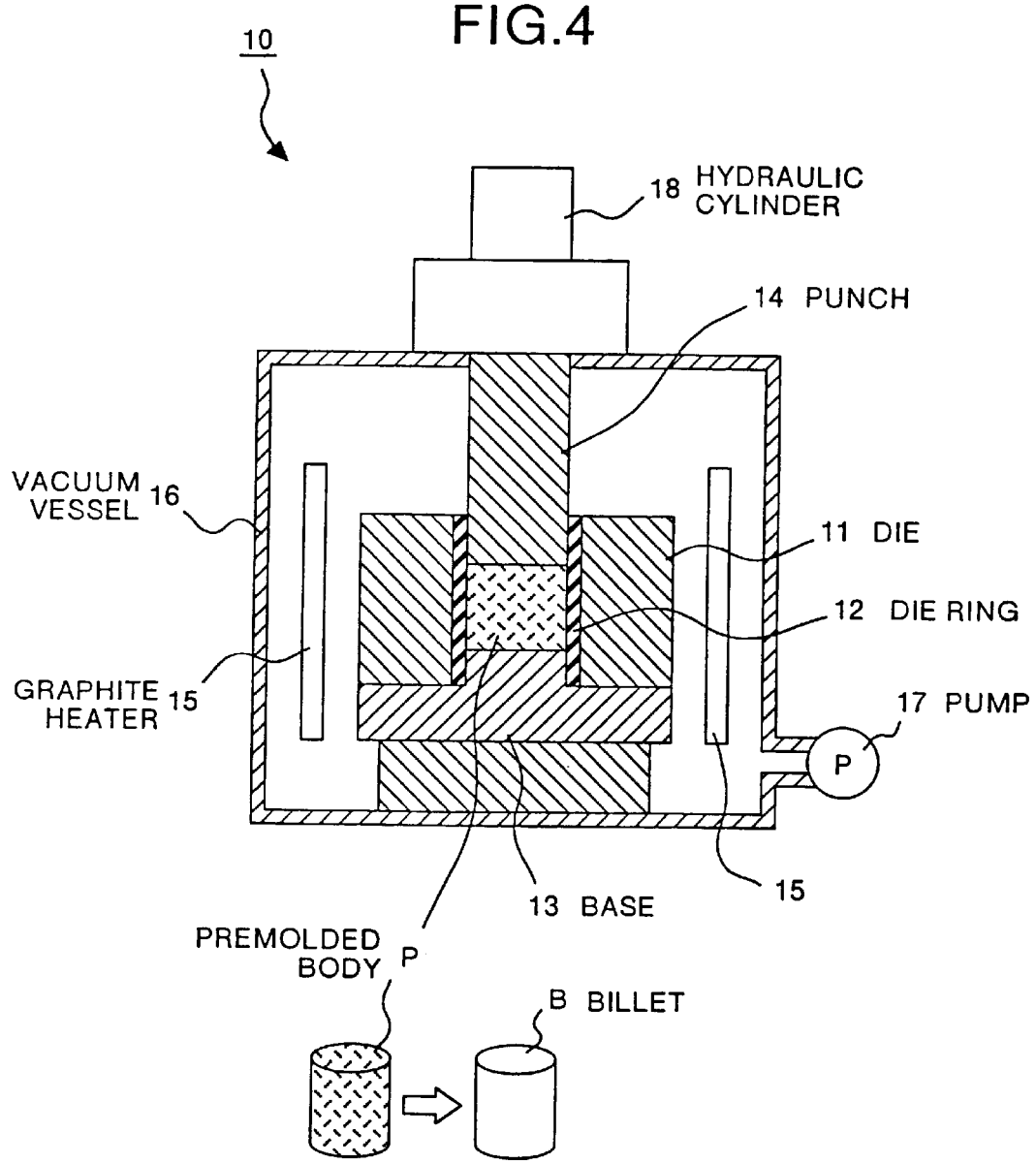
FIG. 4 shows a structure of a vacuum hot press device used for this manufacturing method of the rectangular pipe.

FIG. 4 shows the structure of the vacuum hot press device used for this manufacturing method for the rectangular pipe. The vacuum hot press device 10 comprises a die 11, a die ring 12 provided inside the die 11, a base 13, and a punch 14. These components are made of graphite. The premolded body P manufactured in the step of CIP is inserted into a molding chamber formed with the die ring 12, the base 13, and the punch 14. A graphite heater 15 is disposed around the die 11.

The die ring 12, the base 13, and the punch 14 are accommodated in a vacuum vessel 16. A pump 17 for evacuation is attached to the vacuum vessel 16. The punch 14 is driven by a hydraulic cylinder 18 provided on the top of the vacuum vessel 16. The reason that the die ring 12 is provided inside the die 11 is because the billet will easily be taken out after it is pressurized. The inner diameter of the die 11 is about 350 mm. When hot pressing is actually executed, a lubricant is applied or sprayed to a sliding portion. BN or the like may be used for the lubricant. Although the unidirectional pressing method has been explained, a bidirectional pressing method or a floating method may also be used.

The vacuum-hot pressing is executed by the processing as follows. The premolded body P is inserted into the die 11 after the lubricant is applied inside the die 11, and the punch 14 is set on the body P. The vacuum vessel 16 is evacuated to a predetermined pressure, and the temperature of the chamber is increased up to 400° C. to 500° C. by the graphite heater 15. This temperature range is to be maintained for 30 to 60 minutes, and the application of pressure is started at the temperature of about 200° C. The pressurized and sintered premolded body P, that is, a billet B together with the die 11 is taken out from the vacuum vessel 16, and the billet B is taken out from the die 11. At this time, when the billet B is pushed from the outside, the die ring 12 is also slightly pushed together with the billet B. Consequently, the billet B can easily be taken out. The billet B taken out is extruded in the following extruding step (step S306), and a final product of the rectangular pipe 1 is obtained through stretch-straightening step (step S307) and cutting step (step S308).

According to this manufacturing method for the rectangular pipe 1, as the canning step is omitted and the billet B is molded by the vacuum-hot pressing, the advantages as follows can be obtained. (1) The cost of cans will be saved. (2) The cutting step (step S207) for removing the can will be eliminated. (3) The manufacturing step (step S205) following the cutting step will be omitted. Therefore, the rectangular pipe 1 can efficiently be manufactured at low cost.

Further, in this manufacturing method for the rectangle pipe 1, vacuum sintering may also be used instead of the steps of sealing the premolded body in the can and vacuum-heating and degassing the can (step S205), subjecting the can to HIP (step S206), and performing outer cutting and end face cutting on the can (step S207). The vacuum sintering is executed by evacuating the can to about $10^{-3}$ Torr and heating it at a sintering temperature of 600° C. for 30 sec. By molding the billet B through the vacuum sintering, the same effect can be obtained, and the process can significantly be simplified as compared to that in the HIP processing. Further, in this manufacturing method, aluminum particles are fused by vacuum sintering after the powder is premolded by the CIP step (step S204) so that the density of the premolded body becomes about 80%. Accordingly, electric conductivity as the overall billet is improved, which makes it easy for the billet to be inductively heated in the extruding step in the downstream side (step S208). Thus, it is possible to improve the extruding speed of the billet B.

Figure 5:
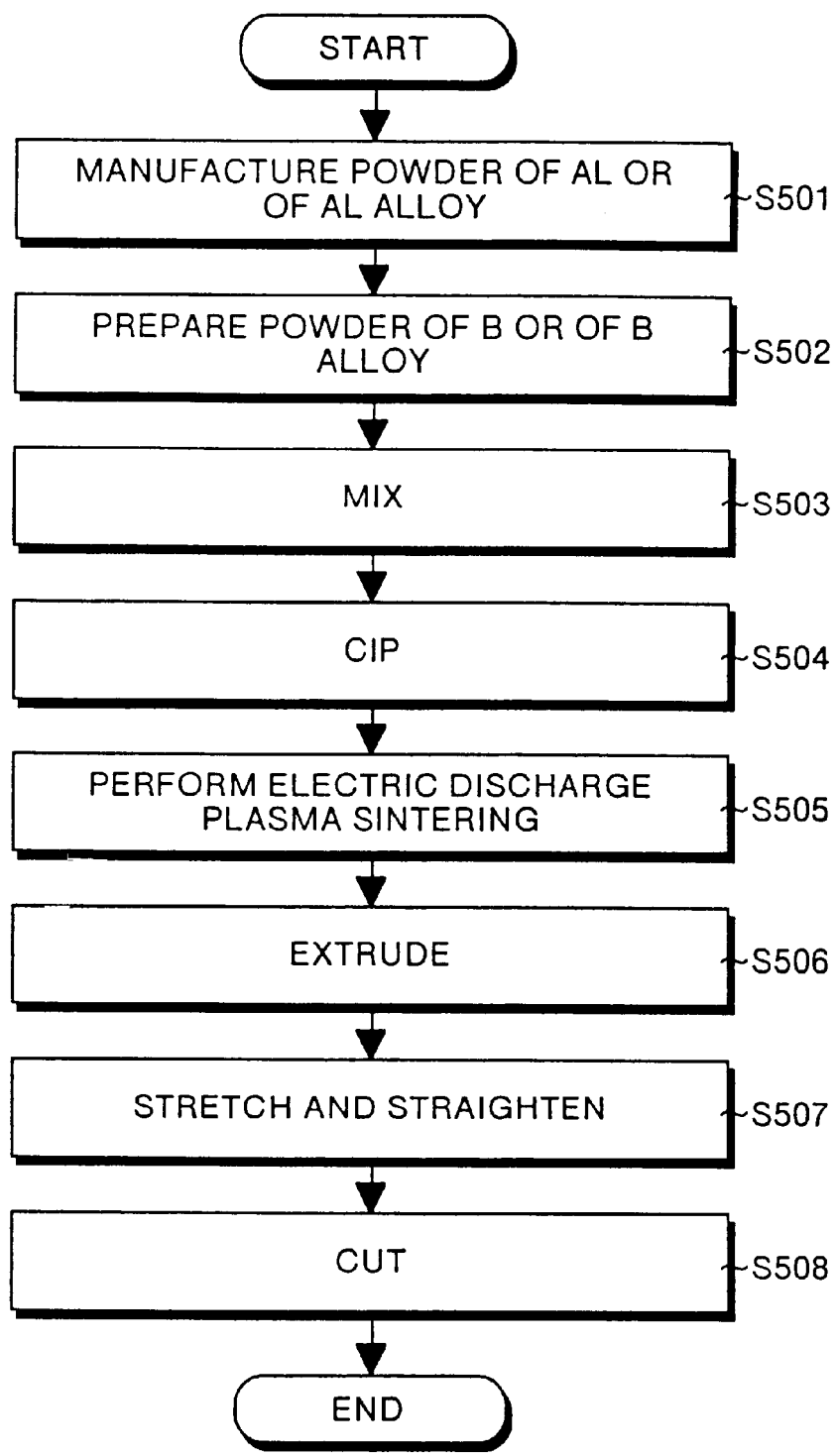
FIG. 5 is a flow chart showing a manufacturing method for the rectangular pipe according to a third embodiment.

The flow chart in FIG. 5 shows a manufacturing method for the rectangular pipe according to a third embodiment of this invention. This manufacturing method for the rectangular pipe 1 is characterized in that electric discharge plasma sintering is used (electric discharge plasma sintering step: S505) instead of the steps of sealing the premolded body in the can and vacuum-heating and degassing the can (step S205), subjecting the can to HIP (step S206), and performing outer cutting and end face cutting on the can (step S207). This electric discharge plasma sintering is executed under the pressurized state using spark discharge energy due to a transient arc discharge phenomenon. The other steps are the substantially same as these in the first embodiment, therefore, explanation of these steps is omitted (steps S501 to S504, and S506 to S508).

Figure 6:
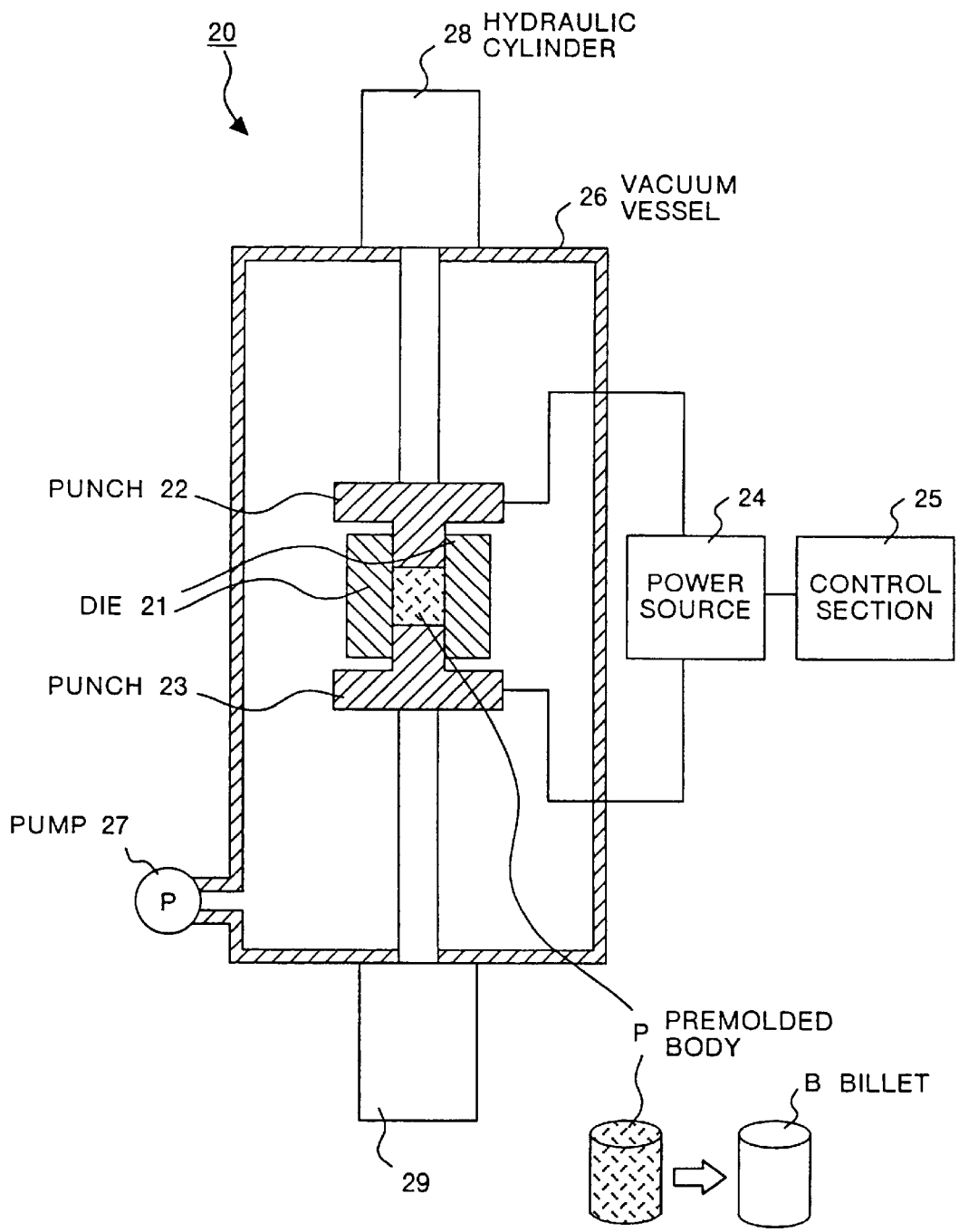
FIG. 6 shows a structure of an electric discharge plasma sintering device used for this manufacturing method of the rectangular pipe.

FIG. 6 shows the structure of an electric discharge plasma sintering device used for this manufacturing method for the rectangular pipe. The electric discharge plasma sintering device 20 comprises a graphite die 21, upper and lower punches 22, 23 that also serve as an upper electrode and a lower electrode, and a power source 24 that provides a pulsed current to the upper and lower punches 22 and 23. This electric discharge plasma sintering device 20 also comprises a control section 25 that controls the power source 24, a vacuum vessel 26 that accommodates the die 21 and the punches 22 and 23, a pump 27 that evacuates the vacuum vessel 26, and hydraulic cylinders 28 and 29 that drive the punches 22 and 23. The premolded body P manufactured by means of CIP is inserted into a molding chamber formed with the die 21 and the punches 22 and 23.

The electric discharge plasma sintering has various advantages such as easy controlling of sintering energy and easy handling. Of these advantages, high-speed sintering is the most important for this manufacturing method. That is, about five hours are required for sintering in the hot pressing, while about only one hour is required for sintering in this electric discharge plasma sintering. Therefore, the manufacturing time can be reduced due to high-speed sintering.

The electric discharge plasma sintering is executed under the conditions such that the degree of vacuum in the vacuum vessel 26 is set to $10^{-2}$ Torr and the temperature is increased up to 500° C. in about 10 minutes. This temperature range is maintained for 10 minutes to 30 minutes, and the premolded body P is pressurized by 5 to 10 tons. When the pulsed current is applied to the upper and lower punches 22 and 23, a discharge point is moved inside the premolded body P, and the discharge is dispersed over the whole. A spark discharging portion locally enters a state of high temperature (1000° C. to 10000° C.), an inter-particle contact part grows from a point to a plane, and a neck is formed to enter a welded state. Accordingly, even if the material is an aluminum base material that forms a hard oxide film, the billet can easily be sintered by breaking down the oxide film on the aluminum surface through the spattering action of electric discharge plasma.

According to this manufacturing method for the rectangular pipe 1, the sintering time can be reduced as compared to the case of using the hot pressing. Further, the passive film on aluminum is broken down by discharging action, which facilitates sintering of the billet. The advantage attained as a result of omitting the canning step is the same as that of the second embodiment. A thermal plasma sintering method can also be used other than the electric discharge plasma sintering. In this thermal plasma sintering method, sintering without pressurization is performed by using extra high-temperature plasma heat. Further, the rectangular pipe can be manufactured through ordinary electric discharge sintering.

In the above mentioned embodiments, the boron-added aluminum alloy is used as a material forming the rectangular pipe 1. It should be noted that, when the average particle diameter of $B_4C$ as an element to be added is large, the strength of the rectangular pipe 1 is decreased. On the other hand, when the average particle diameter of $B_4C$ is made smaller, the particles of $B_4C$ agglomerate and segregate. Therefore, the neutron absorption power may be reduced or the machining capability may be degraded. As is clear from the above explanation, the average particle diameter of Al powder is 80 $\mu$m and the average particle diameter of $B_4C$ powder is 9 $\mu$m. The reason that the particle size of $B_4C$ is 9 $\mu$m is because, if the particle size is made further smaller, agglomeration of the $B_4C$ powder is progressing and segregation may easily occur. Therefore, in a fourth embodiment, by using high-energy ball milling (mechanical alloying) instead of the mixer in the first to the third embodiments, the $B_4C$ powder will be made finer and uniformly dispersed.

Figure 7:
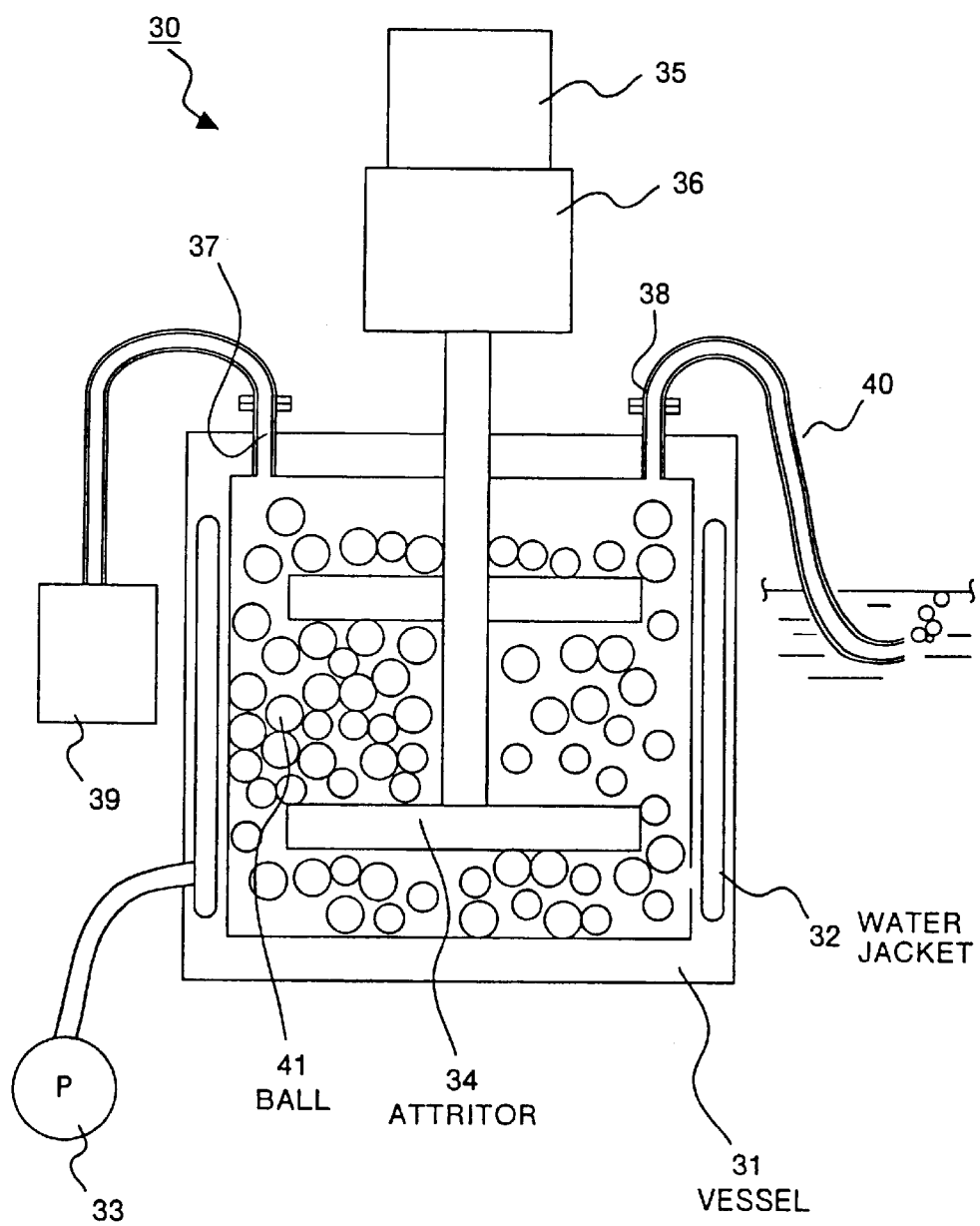
FIG. 7 shows a structure of an attritor mill used for a manufacturing method for the rectangular pipe according to a fourth embodiment.

Although any of an ordinary tumbling mill, a vibration mill, and an attritor mill can be used for this high-energy ball milling, the attritor mill will be explained below as an example. FIG. 7 shows the structure of the attritor mill used for the manufacturing method for the rectangular pipe according to the fourth embodiment. A 150-litter vessel is used for a vessel 31 of the attritor mill 30. A water jacket 32 is formed within the wall of this vessel 31. An appropriate amount of coolant is fed to the water jacket 32 from a feeder 33 such as a pump. An attritor 34 is linked to a drive motor 35 provided in the upper side through a moderator 36. An inflow port 37 and an outflow port 38 are provided on the top surface of the vessel 31 in order to fill the vessel 31 with an argon (Ar) atmosphere as inactive gas. An argon gas bomb 39 is connected to the inflow port 37 and a hose 40 is connected to the outflow port 38 and is put into water to prevent backflow of air. Carbon steel base bearing steel (SUJ-2) is used for the balls 41 for the ball milling.

As conditions required for actually manufacturing high-energy powder, the amount of the balls 41 to be put in the vessel 31 is 450 kg and the diameter of this ball 41 is ⅜ inches. The number of revolutions of the attritor 34 is set to 300 rpm, and further 0.5 l/min of argon is continuously flown to fill the vessel 31 with an inactive gas atmosphere. Prior to ball milling, 30-cc ethanol or methanol as an assistant relative to the powder of 1 kg is poured into the vessel 31. The amount of the powder to be poured into the vessel 31 is 15 kg. Of this amount, the amount of $B_4C$ is 0.75 kg (5 wt %). Al powder having average particle diameter of 35 $\mu$m is used for this Al powder, and $B_4C$ powder having average particle diameter of 9 $\mu$m is used for this $B_4C$ powder. The time required for ball milling can be selected from a range of one hour to 10 hours as necessary.

Figure 8:
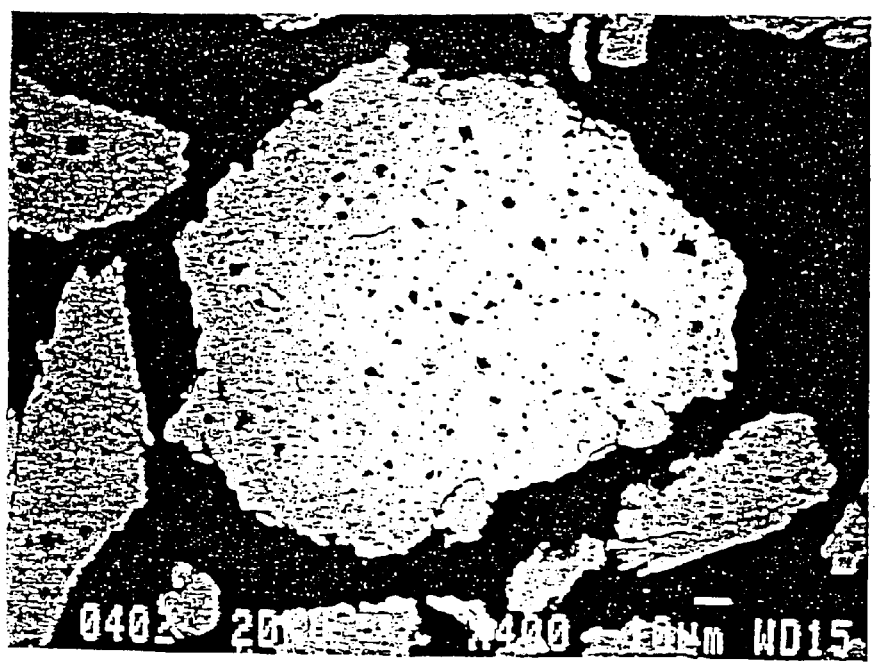
FIG. 8 is an enlarged view showing high-energy powder manufactured by MA.

The particles of aluminum put during the process of ball milling are shocked by the balls 41 to be milled, folded, and flattened. Accordingly, the outer diameter of the particles of the aluminum is spread in the same plane direction to become about 80 μm. On the other hand, the $B_4C$ powder is milled by ball milling to be reduced to about 0.5 μm to 1.0 μm in particle size, and is uniformly rubbed into the aluminum matrix. The enlarged view in FIG. 8 shows high-energy powder manufactured by MA. By referring to this figure, it is clearly seen that the Al powder is flattened by ball milling and the particles of the $B_4C$ powder in their finer state are dispersed into the matrix of the Al powder.

During the process of ball milling, the balls 41 are worn out due to a collision between these balls 41, and the component of the balls 41 may sometimes be mixed into the powder as an impurity. Therefore, any element to be added as an impurity is previously contained in the component of the ball 41 and this element may be added to the powder during the process of ball milling. This element may include zircon. After the ball milling is finished, the high-energy powder is taken out from the vessel 31, and is subjected to the hot pressing step and extruding step to mold the rectangular pipe 1 as shown in FIG. 1.

According to this manufacturing method for the rectangular pipe 1, the $B_4C$ powder, that is made finer and uniform, can be dispersed into the Al powder matrix, thus improving the strength of the rectangular pipe 1. More specifically, the strength can be improved up to about 1.2 to 1.5 times as compared to that of the rectangular pipe 1 obtained by the methods according to the first to third embodiments. Further, the $B_4C$ powder having a high degree of hardness is dispersed finely and uniformly into the matrix, thereby preventing agglomeration of the $B_4C$ powder. Thus, extrusion capability can be improved, which is effective in reduction in abrasion of the die for extrusion.

Further, as the assistant, ethyl alcohol or methyl alcohol may also be used. The ethyl alcohol is used to produce an aluminum oxide, and this oxide contributes to improvement in the mechanical strength of the rectangle pipe 1. Likewise, the methyl alcohol is used to produce aluminum carbide, and this carbide contributes to improvement in the mechanical strength of the rectangle pipe 1. Further, for cooling the attritor mill, a path for a cooling medium may be formed in the attritor other than the water jacket 32 to cool the attritor mill. Any known cooling medium such as helium gas may be used other than coolant. Especially, when a large amount of mechanical alloying is performed continuously, the attritor mill needs to be cooled sufficiently. Such case can be dealt with by increasing the amount of cooling medium to be flown, providing the path for the cooling medium in both of the water jacket 32 and the attritor 34, or using balls 41 with high thermal conductivity.

Figure 9:
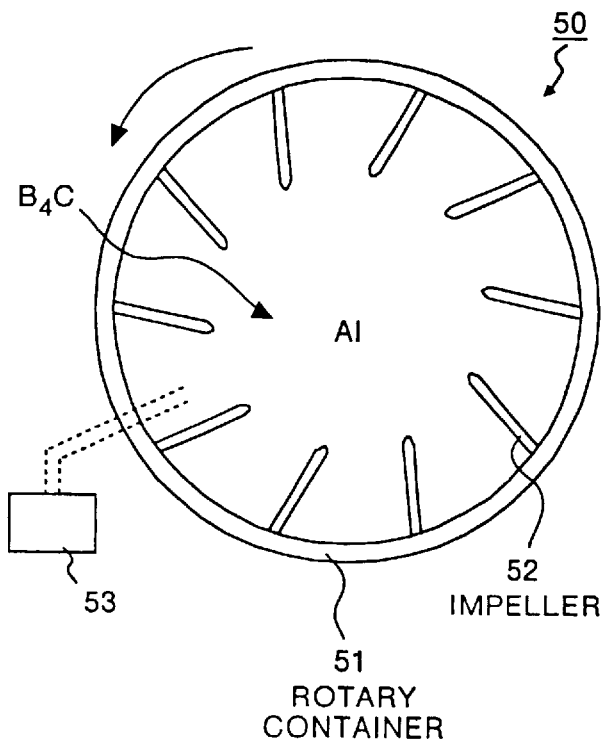
FIG. 9 shows a schematic structure of a powder manufacturing device used to execute a manufacturing method of powder according to a fifth embodiment.
Figure 10:
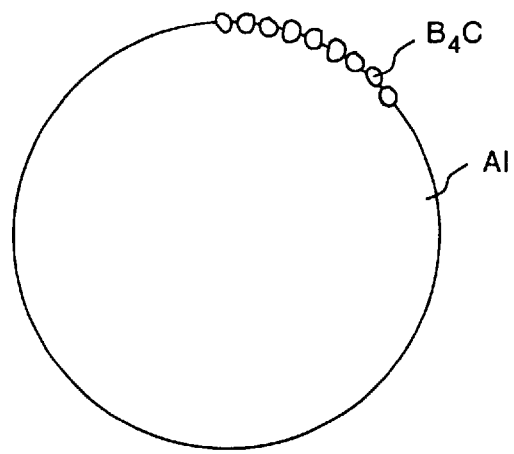
FIG. 10 shows powder manufactured by the powder manufacturing device shown in FIG. 9.

The $B_4C$ powder may be attached around the Al powder by the powder manufacturing device that generates high-velocity airflow. This powder manufacturing method for agitating additives in the high-velocity airflow to be attached around the powder particles of the matrix is referred to as hybridization. FIG. 9 shows the schematic structure of the powder manufacturing device used to execute a manufacturing method of powder according to a fifth embodiment. This powder manufacturing device 50 comprises a cylindrical rotary container 51 that rotates at a high speed, a plurality of impellers 52 provided inside the rotary container 51, and a gas bomb 53 that supplies inactive gas such as nitrogen gas.

The method for manufacturing powder will be explained below. A predetermined amount of Al is put into the rotary container 51 and this rotary container 51 is rotated. Accordingly, a high-velocity airflow is generated in the rotary container 51, and the Al powder spirally rotates by the high-velocity airflow. A predetermined amount (5 wt %) of $B_4C$ powder is then put into this rotating rotary container 51. Because of continuing the rotation in this state for a specified period, fine particles of the $B_4C$ powder are sunk into and attached to the periphery of the Al powder particles. Al powder having average particle diameter of 80 μm is used here for this Al powder, and $B_4C$ powder having average particle diameter of 2 μm is used here for this $B_4C$ powder. The $B_4C$ powder whose average particle diameter is 2 μm is commercially available, but in an ordinary method of rough mixing (by the V-shaped rotary mixer, or the like), when this $B_4C$ powder is mixed with another metal powder, the particles of the $B_4C$ powder agglomerate during sintering (therefore, $B_4C$ powder whose average particle diameter is 10 μm or more is used in the ordinary mixing method so that the particles hardly agglomerate). The $B_4C$ powder is more or less milled inside the rotary container 51, therefore, the average particle diameter of the $B_4C$ powder, that is actually attached to the Al powder particle, becomes slightly smaller than 2 μm.

The rotating speed of the rotary container 51 is set to 70 to 80 m/sec. If the rotating speed is 60 m/sec or lower, for example, the $B_4C$ powder is not attached to the Al powder. Resultantly, the composition of the aluminum alloy is changed or the remaining $B_4C$ powder may agglomerate. On the other hand, if the rotating speed is 100 m/sec or higher, kinetic energy of the Al powder becomes too high, so that the Al powder is welded due to heat produced at the time of its collision against the impeller. Therefore, the rotating speed is preferably set within a range of 70 to 80 m/sec. The aluminum alloy powder manufactured in this manner is molded to the rectangular pipe 1 as shown in FIG. 1 through the hot pressing step and the extruding step.

According to this manufacturing method for the rectangular pipe 1, the $B_4C$ powder is sunk into and attached to the surface of the Al powder. Therefore, the $B_4C$ powder is adequately dispersed, so that the $B_4C$ powder hardly agglomerate during sintering. Thus, segregation of the billet can be prevented. Further, the oxide film formed on the surface of the Al powder particle is slightly removed through collision of the particles of the $B_4C$ powder against the Al powder particles, thus improving sintering capability. Therefore, it is possible to mold the rectangular pipe 1 excellent in its mechanical strength.

Particularly, the rectangular pipe manufactured in this manufacturing method is adequate for the PWR basket that needs to be formed with a high strength material because the spent fuel assembly is heavy in weight.

Figure 11:
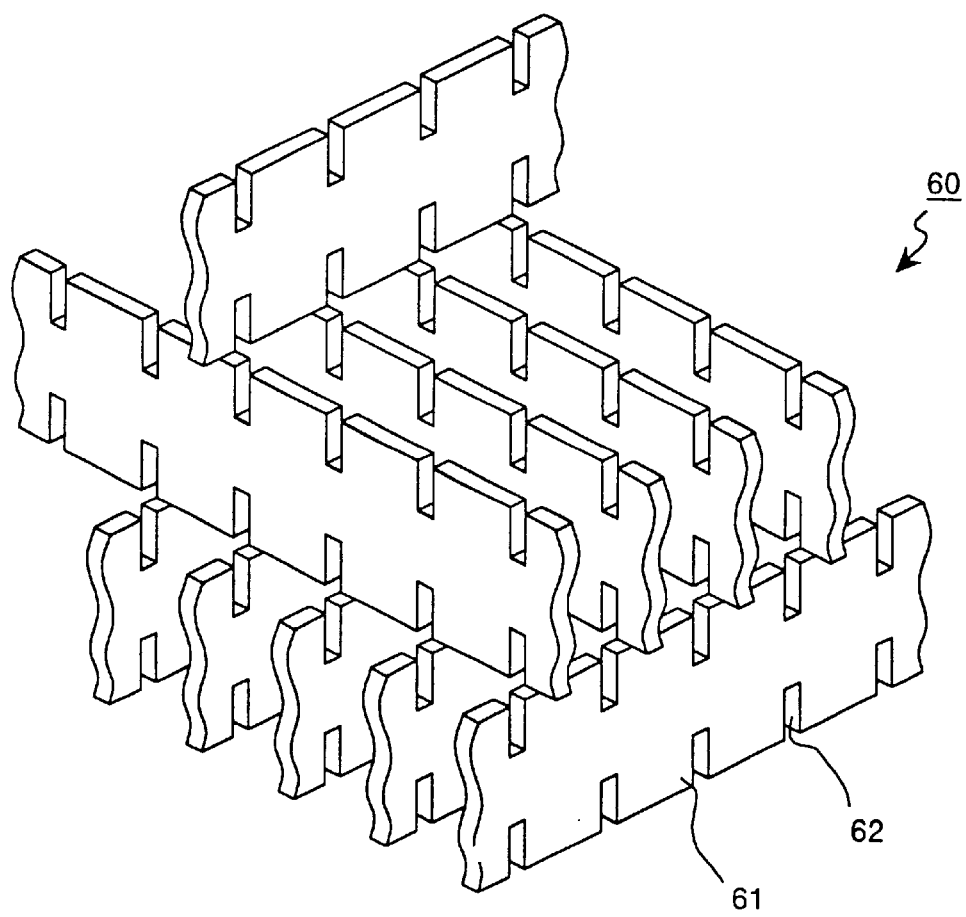
FIG. 11 is a perspective view showing the plate type of rack.

The rack, that accommodates spent fuel assemblies, can also be changed to a plate type rack instead of the rectangular pipe type rack. The perspective view in FIG. 11 shows the plate type of rack. In this plate type rack 60, a plate member 61 having about 300 mm to 350 mm in width is molded by extruding the billet manufactured by any of the manufacturing methods according to the first to fifth embodiments. A plurality of slits 62 is continuously made in each of these plate members 61. These plate members 61 are alternately fitted into each other at their slit parts 62 longitudinally and latitudinally to form a grid-shaped cross section. This plate type rack 60 has the thickness of the plate thinner as compared to that of the rectangular pipe 1, therefore, the amount of boron to be dispersed into aluminum is set to be slightly larger. This plate type rack can be used for a cask or a rack for the spent fuel pool.

Figure 12:
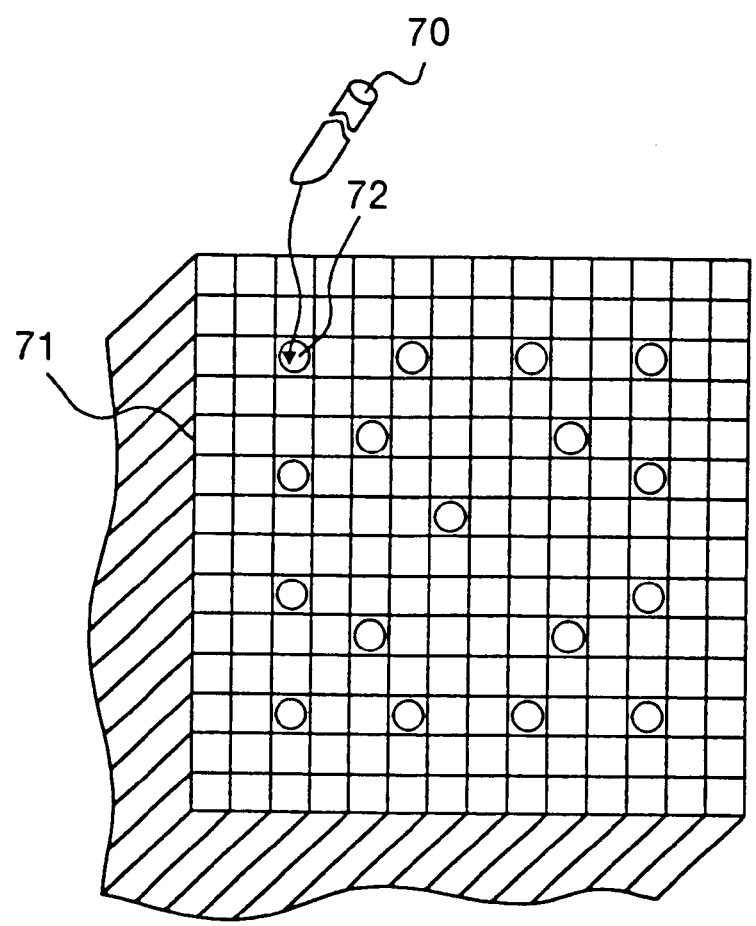
FIG. 12 shows spent fuel assemblies.

In the first to fifth embodiments, the neutron absorption power is provided to the rectangular pipe 1 by dispersing boron into the rectangular pipe 1 so that the spent fuel assembly is prevented from its going critical. In a seventh embodiment, instead of the rectangular pipe 1, a rod that absorbs neutrons produced from the spent fuel assembly is molded. The rod 70 is inserted into a control rod cluster guide tube 72 (or instrument tube) of the spent fuel assembly 71 as shown in FIG. 12. Insertion of this rod 70 makes it possible to ensure predetermined neutron absorption power. Accordingly, the need for dispersing a large amount of boron into the rectangular pipe 1 is eliminated. Further, in the manufacture of this rod 70, only the shape of die used in the final extruding step is different from that of the rectangular pipe 1. Therefore, the manufacturing method according to any of the first to fifth embodiments can be used.

Figure 13:
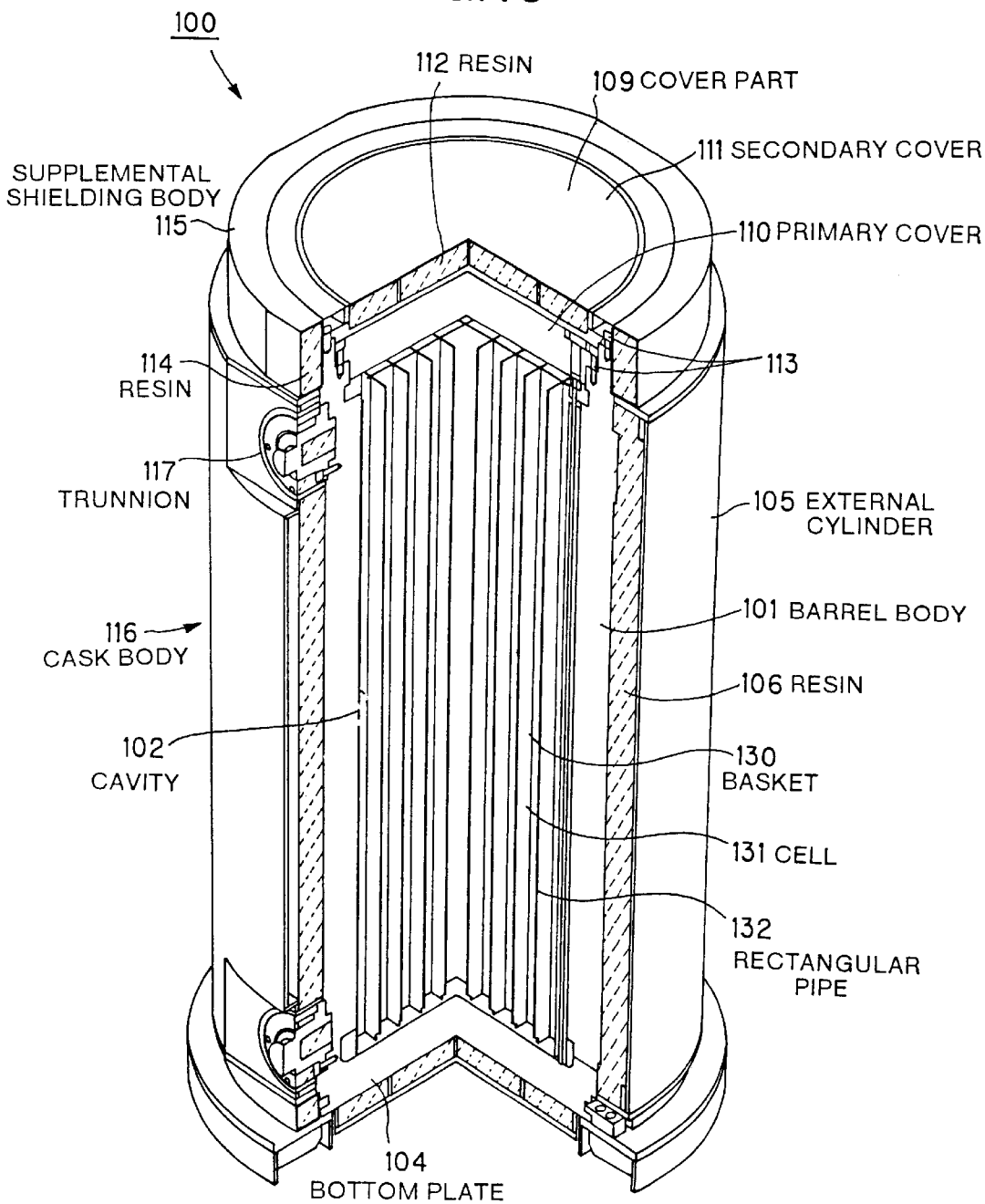
FIG. 13 is a perspective view of a cask.
Figure 14:
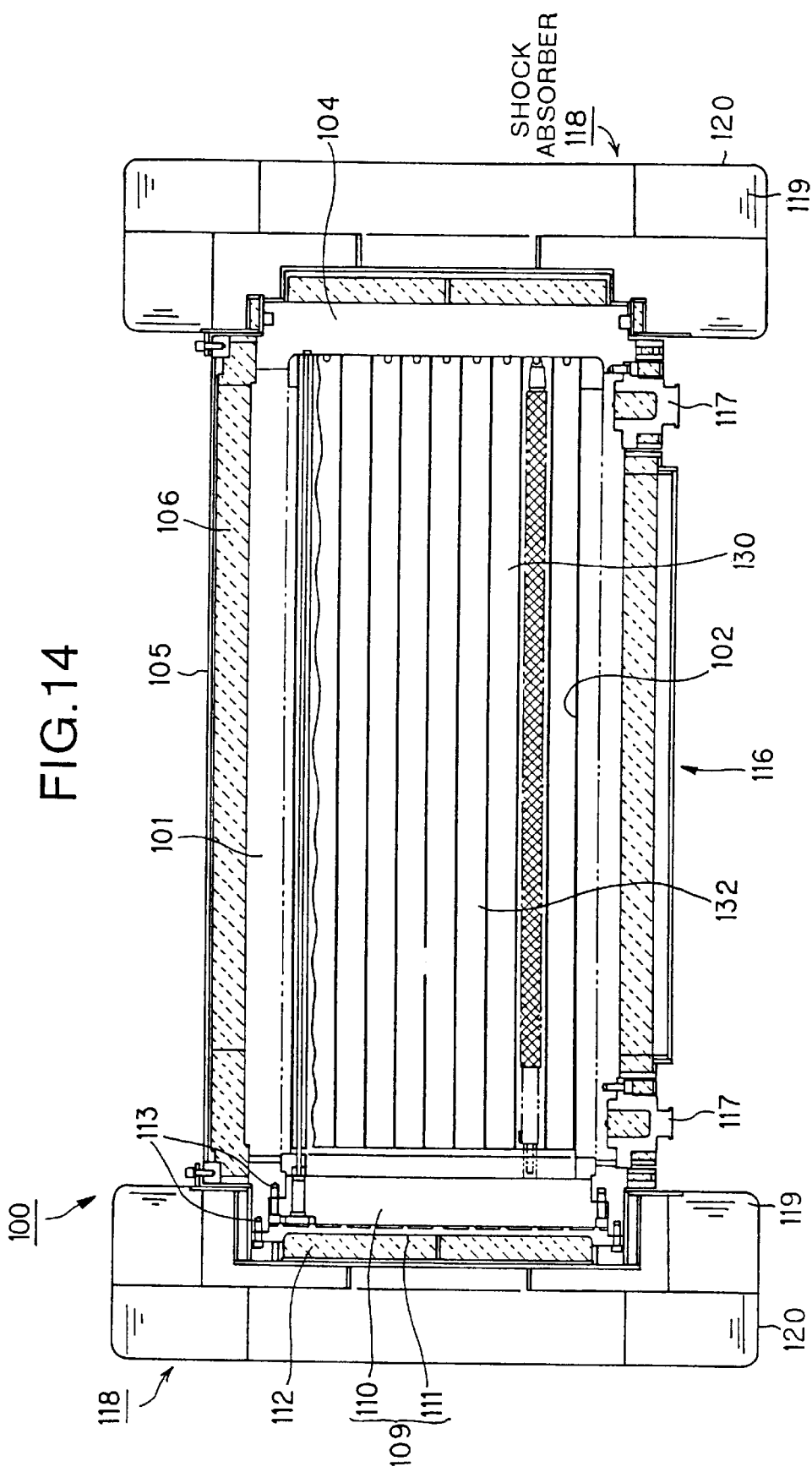
FIG. 14 is a cross-sectional view showing an axial direction of the cask shown in FIG. 13.
Figure 15:
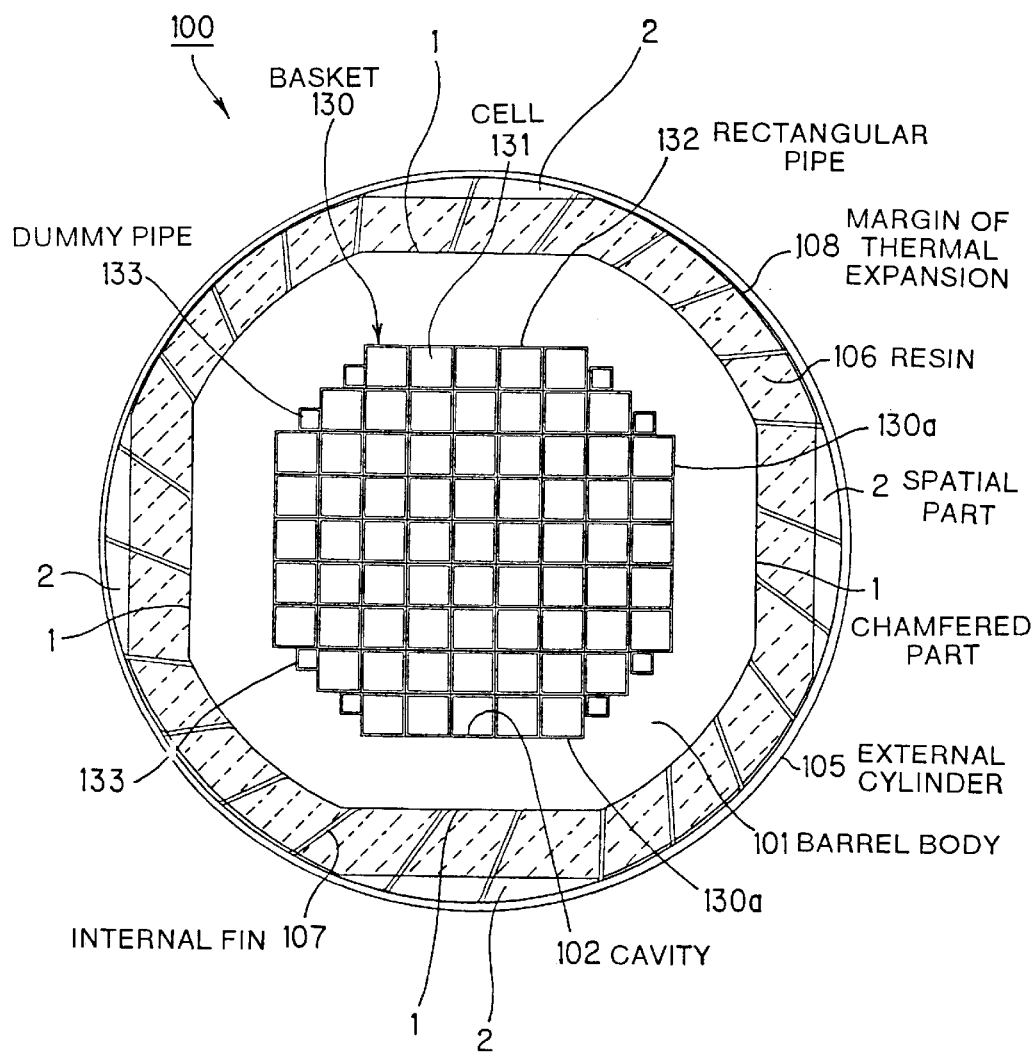
FIG. 15 is a cross-sectional view showing a radial direction of the cask shown in FIG. 13.

A specific example of using the rectangular pipe 1 will be explained below. The perspective view in FIG. 13 shows a cask. FIG. 14 shows across-sectional view in the axial direction of the cask shown in FIG. 13. FIG. 15 shows a cross-sectional view in the radial direction of the cask shown in FIG. 13. This cask 100 is machined so as to fit the internal surface of a cavity 102 of a barrel body 101 with the peripheral shape of a basket 130.

The barrel body 101 and a bottom plate 104 are forged steel made of carbon steel having a function of shielding gamma rays. Stainless steel may be used instead of this carbon steel. The barrel body 101 and the bottom plate 104 are welded to each other. In order to ensure hermetic capability as a pressure-resistant container, a metal gasket is provided between a primary cover 110 and the barrel body 101.

The space between the barrel body 101 and an external cylinder 105 is filled with resin 106, which is polymeric materials containing a large amount of hydrogen and has a function of shielding neutrons. Further, a plurality of copper-made internal fins 107, that perform thermal conduction, are welded between the barrel body 101 and the external cylinder 105. The resin 106 is poured in its liquid state into a space formed with these internal fins 107, cooled down, and solidified. In order to uniformly radiate heat, it is preferable to provide the internal fins 107 in high density at parts where the amount of heat is large. A margin of thermal expansion 108 by several millimeters is provided between the resin 106 and the external cylinder 105.

A cover part 109 is formed with the primary cover 110 and a secondary cover 111. The primary cover 110 is a disk-like cover made of stainless steel or carbon steel that shields gamma rays. The secondary cover 111 is also a disk-like cover made of stainless steel or carbon steel, but the top of the secondary cover 111 is filled with resin 112 as a shielding body against neutrons. The primary cover 110 and the secondary cover 111 are screwed to the barrel body 101 with bolts 113 made of stainless steel or carbon steel. Further, metal gaskets are provided between the primary cover 110/ the secondary cover 111 and the barrel body 101 respectively to maintain internal hermeticity. A supplemental shielding body 115, in which resin 114 is sealed, is provided around the cover part 109.

Trunnions 117 for hanging the cask 100 are provided on both sides of a cask body 116. Although FIG. 13 shows the example of the cask with the supplemental shielding body 115, the supplemental shielding body 115 is detached from the cask and shock absorbers 118 are attached thereto at the time of transferring the cask 100 (see FIG. 14). The shock absorber 118 is structured to place a cushioning material 119 such as a redwood material in the external cylinder 120 made of stainless steel.

Figure 16:
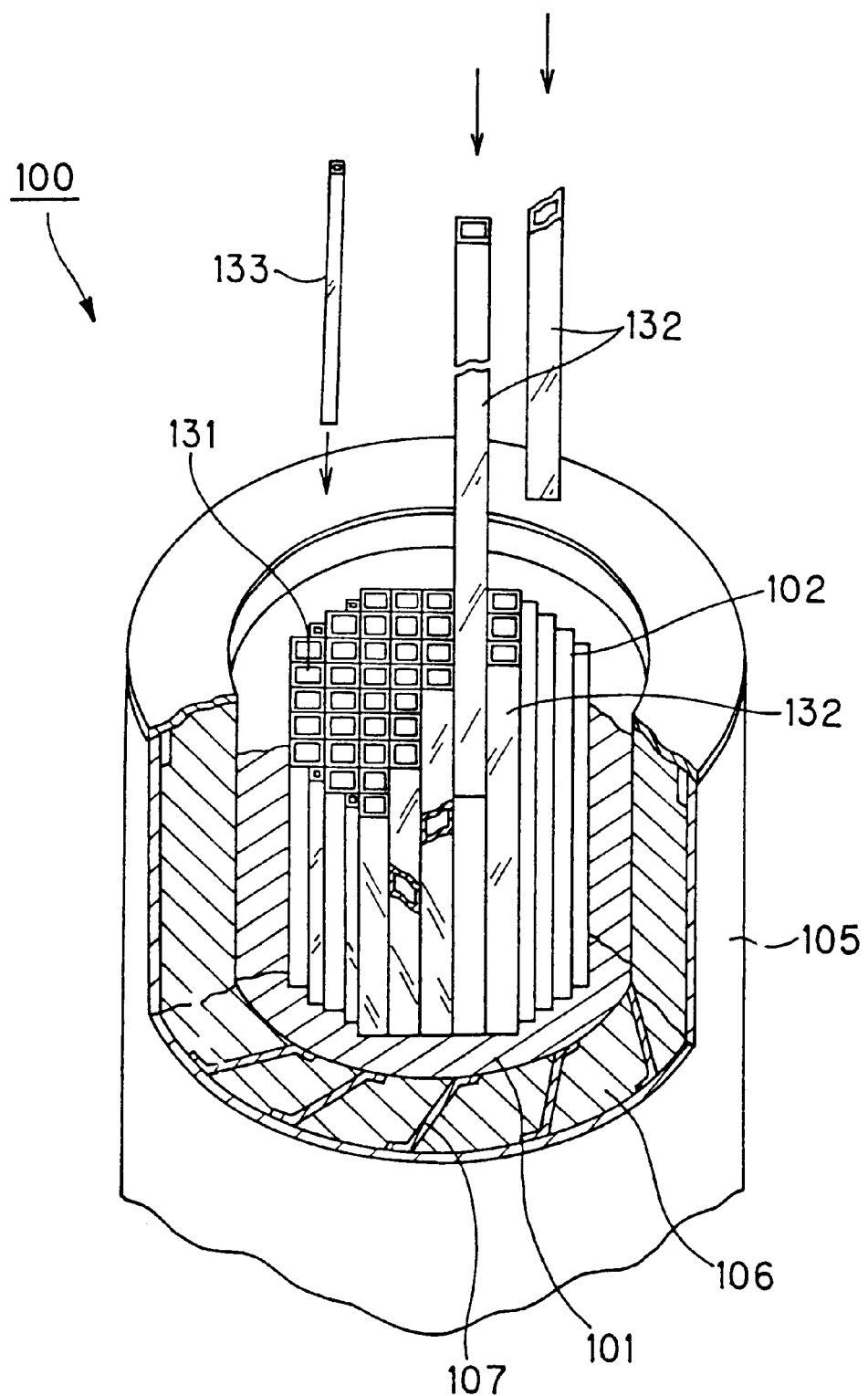
FIG. 16 is a perspective view showing how to insert the rectangular pipe.

The basket 130 consists of 69 rectangular pipes 1 forming cells 131 that accommodate spent fuel assemblies. The rectangular pipes manufactured in the same manner as that according to any of the first to fifth embodiments are used for these rectangular pipes 1. FIG. 16 is a perspective view showing how to insert the rectangular pipe. The rectangular pipes 1 manufactured in the steps are successively inserted into the cavity 102 along the machined shape inside the cavity 102.

As shown in FIG. 16 and FIG. 14, dummy pipes 133 are inserted in both sides of a rectangular pipe column, which has five or seven cells, in the cavity 102. These dummy pipes 133 are used for the purpose of reducing the weight of the barrel body 101, uniforming the thickness of the barrel body 101, and firmly fixing the rectangular pipes 1. The boron-containing aluminum alloy is also used for the dummy pipe 133, and is manufactured in the same steps as explained above. However, these dummy pipes 133 may be omitted.

Each spent fuel assembly accommodated in the cask 100 includes a fissionable material and a fission product or the like, and generates radiation accompanied by decay heat. Therefore, it is necessary to securely maintain the heat removal function, the shielding function, and the criticality prevention function of the cask 100 for its storage period (about 60 years). In the cask 100 according to the eighth embodiment, the internal side of the cavity 102 of the barrel body 101 is machined and the basket 130 consisting of the rectangular pipes 1 is inserted into the cavity 102 so that the outside of the basket 130 is in substantial contact with the internal side of the cavity 102, that is, without a large gap between these two. Further, the internal fins 107 are provided between the barrel body 101 and the external cylinder 105. Accordingly, the heat from the fuel rod is conducted to the barrel body 101 through the rectangular pipe 1 or the filled helium gas, and is discharged from the external cylinder 105 mainly through the internal fins 107.

The gamma rays produced from the spent fuel assemblies are shielded by the barrel body 101, the external cylinder 105, and the cover part 109 made of carbon steel or stainless steel. The neutrons are shielded by the resin 106 to prevent influence on operators involved in the operations of radiation from radiation exposure. More specifically, the cask is designed to attain a shielding function such that a surface dose equivalent rate is 2 mSv/h or less and a dose equivalent rate in the place one meter apart from the surface is 100 $\mu$ Sv/h or less. Further, as the boron-containing aluminum alloy is used for the rectangular pipe 1 forming the cell 131, it is possible to prevent the spent fuel assembly from its going critical due to absorption of the neutrons.

Further, according to this cask 100, the internal side of the cavity 102 of the barrel body 101 is machined and the rectangular pipes 1, that form the outer periphery of the basket 130, are inserted into the cavity 102 so that the rectangular pipes are in substantial contact with the internal side of the cavity 102. Therefore, the facing area between the rectangular pipe and the cavity is widened to enable sufficient thermal conductivity from the rectangular pipe 1. Further, a spatial area in the cavity 102 can be eliminated, therefore, the barrel body 101 can be made more compact in size and lighter in weight if the number of accommodated rectangular pipes 1 stays the same. Conversely, if the outer diameter of the barrel body 101 is not changed, the larger number of cells can be ensured by the eliminated spatial area, thus increasing the number of spent fuel assemblies to be accommodated. More specifically, in this cask 100, the number of spent fuel assemblies can be increased to 69 pieces, and the outer diameter of the cask body 116 can be suppressed to 2560 mm, and the weight to 120 tons.

Although the cask for the BWR is explained in this embodiment, the cask for the PWR can employ the same structure. A flux trap is generally provided in the basket for the PWR. This flux trap is simultaneously molded in the extruding step of the rectangle pipe 1.

Figure 17:
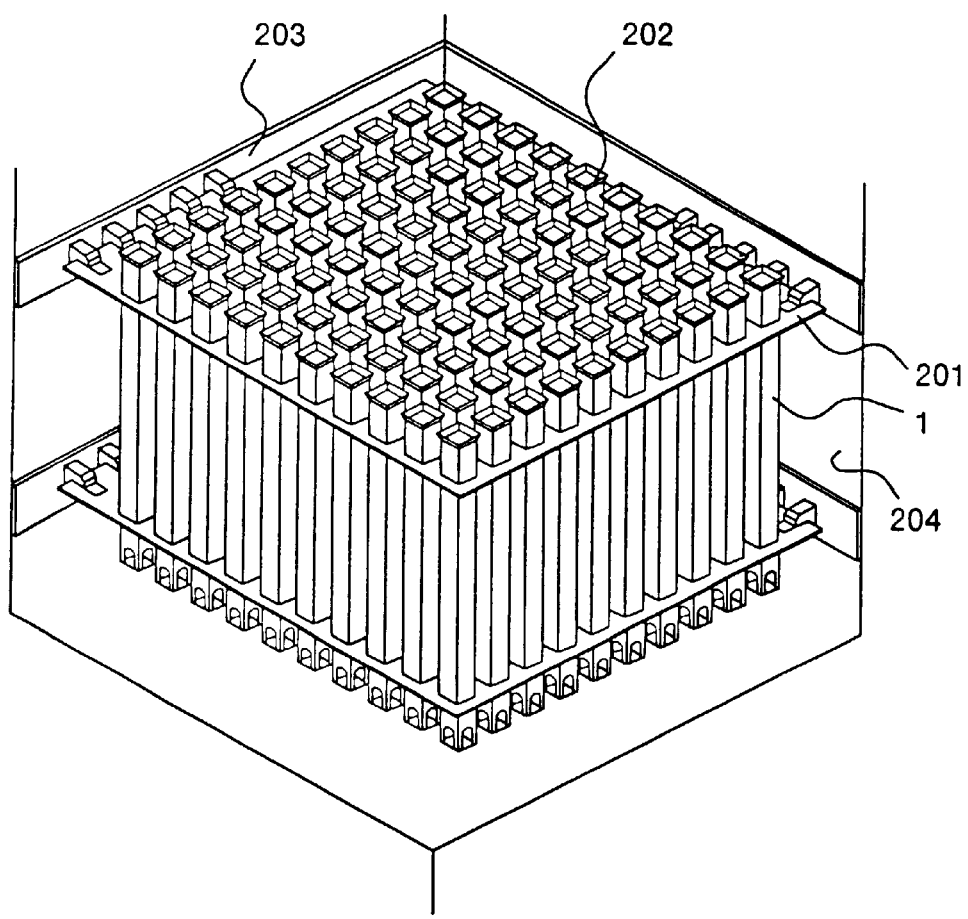
FIG. 17 is a perspective view showing a spent fuel pool for a PWR.

Another example of using the rectangular pipe will be explained below. The perspective view in FIG. 17 shows the spent fuel pool for the PWR. The spent fuel pool 200 has a rack 202 explained as follows. This rack 202 has a plurality of rectangular pipes 1, which have been manufactured in the same manner as any in the first to the fifth embodiments, provided in their upright position. Further, the upper and lower parts of the rectangular pipes 1 are supported by support plates 201. The rack 202 is placed in a reinforced concrete pit 203, and the internal surface of this pit 203 is lined with a lining 204 of a stainless steel plate in order to prevent leakage of water from the pit. This pit 203 is always filled with boric-acid containing water. The spent fuel pool 200 is excellent in neutron absorption power because it is formed with the rectangular pipes 1, thus ensuring the solidity of its structure. Accordingly, the spent fuel assembly can effectively be prevented from its going critical.

Further, the rectangle pipe 1 can also be used as a basket for a canister that accommodates the spent fuel assembly, although it is not shown. It does not matter whether the spent fuel assembly to be accommodated is for the PWR and the BWR. The canister is a vessel made with a stainless steel plate or a carbon steel plate. This vessel is accommodated in a storage container that has a barrel body also made of stainless steel or carbon steel with a neutron shielding body provided around the barrel body, or is accommodated and stored in a barrel body made of concrete.

As explained above, according to one aspect of this invention, the aluminum powder is mixed with the neutron absorbing material powder, and this mixed powder is formed to a premolded body by the CIP. This premolded body is canned and then sintered. Accordingly, the high-quality spent fuel storage member can be manufactured. Further, sintering is performed by the hot pressing or the HIP, which makes it possible to manufacture the spent fuel storage member with higher quality.

According to another aspect of this invention, the canning step is omitted and the vacuum sintering is performed. Therefore, the need for machining such as outer cutting is eliminated, so that the manufacturing process can be simplified. Consequently, the spent fuel storage member can be manufactured at extremely low cost. Further, by performing the sintering through the vacuum hot pressing, the low-cost, yet high-quality spent fuel storage member can be manufactured.

According to still another aspect of this invention, the premolded body is subjected to electric discharge sintering, therefore sintering can be finished within a short period. Thus, efficiency of its manufacture is improved. Further, by using electric discharge plasma sintering as electric discharge sintering, the higher degree of sintering can be attained, which makes it possible to obtain the high-quality billet at low cost.

Further, by extruding the billet manufactured by the method, the rectangular pipe or the rod as the spent fuel storage member can easily be manufactured.

Further, the aluminum powder is mixed with the neutron absorbing material powder by using mechanical alloying. Accordingly, the powder particles of the neutron absorbing material can be dispersed finely and uniformly into the aluminum matrix. Thus, the mechanical strength of the spent fuel storage member is improved.

Further, the ball used for ball milling contains an element to be added as its main component, therefore, any element to be added to an aluminum matrix during ball milling can be added thereto during this process. Thus, the manufacturing process can be simplified.

Further, by performing hybridization, the particles of the neutron absorbing material can be dispersed into the aluminum finely and uniformly. Thus, the mechanical strength of the spent fuel storage member is improved. At this time, the rotating speed of the rotary container used for hybridization is set to 70 to 80 m/sec, which makes it possible to obtain a desired spent fuel storage member without changing the mixing ratio.

According to still another aspect of this invention, by the mechanical alloying, the particles of the aluminum powder are flattened and the milled particles of the boron or the boron compound are dispersed into this aluminum powder so as to be rubbed into the aluminum powder particles. Therefore, agglomeration of the particles during sintering can be prevented, and the components of the spent fuel storage member manufactured using this aluminum powder become homogeneous, thus improving the mechanical strength.

According to still another aspect of this invention, the particles of the boron or the boron compound are sunk into and attached to the surfaces of the particles of the aluminum powder by hybridization. Therefore, agglomeration of the particles during sintering can be prevented, thus, the spent fuel storage member manufactured using such powder becomes excellent in its mechanical strength.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A manufacturing method for a spent fuel storage member in which the member used for storage of spent fuel is manufactured, comprising the steps of:

ball milling a powder of aluminum having an average diameter of 35 $\mu$m with a powder of boron carbide as a neutron absorbing material having an average diameter of 9 $\mu$m in an argon atmosphere and placing the powders into a mold wherein said ball milling includes using balls of a metal other than aluminum;

molding the powders into a premolded body by cold isostatic pressing;

canning the premolded body; and sintering the canned premolded body wherein the powder of boron carbide comprises $B_4C$ powder and an amount of the $B_4C$ powder mixed is between 1.5 wt % and 9 wt %.

2. The manufacturing method for a spent fuel storage member according to claim 1, wherein the sintering is performed by means of hot pressing or hot isostatic pressing.

3. The manufacturing method for a spent fuel storage member according to claim 1 further comprising the step of:

molding a rectangular pipe by extrusion molding the sintered premolded body.

4. The manufacturing method for a spent fuel storage member according to claim 1 further comprising the step of:

molding a rod, that is inserted into a guide tube of spent fuel, by extrusion molding the sintered premolded body.

5. The manufacturing method for a spent fuel storage member according to claim 1, wherein the ball milling comprises mechanical alloying of the powders.

6. The manufacturing method for a spent fuel storage member according to claim 5, wherein said ball milling including using balls having a predetermined element contained therein for being added to the aluminum matrix by attrition of said balls during the ball milling of the powders.

7. The manufacturing method for a spent fuel storage member according to claim 1, which comprises using a powder mixing device, for generating a high-velocity airflow during ball milling of the powders.

8. The manufacturing method for a spent fuel storage member according to claim 7, which comprises using a rotary container for milling of the powders and generating a high-velocity airflow into the container at a rate of 70 to 80 m/sec.

9. A manufacturing method for a spent fuel storage member in which the member used for storage of spent fuel is manufactured, comprising the steps of:

ball milling a powder of aluminum having an average diameter of 35 $\mu$m with the powder of boron carbide as a neutron absorbing material having an average diameter of 9 $\mu$m in argon atmosphere and placing the powders into a mold;

molding the powders into a premolded body by cold isostatic pressing;

canning the premolded body; and sintering the canned premolded body, wherein the powder of boron carbide comprises $B_4C$ powder and amount of the $B_4C$ powder mixed is between 1.5 wt % and 9 wt %.

* * * * *

UNITED STATES PATENT AND TRADEMARK OFFICE
CERTIFICATE OF CORRECTION

PATENT NO.     : 6,630,100 B1
DATED          : October 7, 2003
INVENTOR(S)    : Murakami et al.

It is certified that error appears in the above-identified patent and that said Letters Patent is hereby corrected as shown below:

<u>Title page, Item [54] and Column 1, lines 1 and 2,</u>
Title should read -- MANUFACTURING METHOD FOR SPENT FUEL STORAGE MEMBER AND MIXED POWDER --

Signed and Sealed this

Twentieth Day of April, 2004

JON W. DUDAS
*Acting Director of the United States Patent and Trademark Office*